(12) United States Patent
Sambamurty

(10) Patent No.: US 8,043,066 B2
(45) Date of Patent: Oct. 25, 2011

(54) TRAILING EDGE BONDING CAP FOR WIND TURBINE ROTOR BLADES

(75) Inventor: Saravakota Sambamurty, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/796,003

(22) Filed: Jun. 8, 2010

(65) Prior Publication Data

US 2011/0142661 A1 Jun. 16, 2011

(51) Int. Cl.
*F04D 29/38* (2006.01)

(52) U.S. Cl. .................................. 416/224; 416/241 B

(58) Field of Classification Search .................. 416/224, 416/229 R, 229 A, 228, 234, 241 R, 241 A, 416/241 B
See application file for complete search history.

(56) References Cited

U.S. PATENT DOCUMENTS

| | | | |
|---|---|---|---|
| 6,076,776 A | 6/2000 | Breitbach et al. | |
| 6,132,181 A | 10/2000 | McCabe | |
| 6,398,502 B1 | 6/2002 | Wobben | |
| 6,932,573 B2 | 8/2005 | Liang | |
| 6,966,758 B2 | 11/2005 | Grabau et al. | |
| 7,153,090 B2 | 12/2006 | DeLeonardo et al. | |
| 2003/0116262 A1 | 6/2003 | Stiesdal et al. | |
| 2004/0253114 A1 | 12/2004 | Gunneskov et al. | |
| 2006/0188378 A1 | 8/2006 | Bech et al. | |
| 2007/0025858 A1 | 2/2007 | Driver et al. | |
| 2007/0036659 A1 | 2/2007 | Hibbard | |
| 2007/0140858 A1 | 6/2007 | Bakhuis et al. | |
| 2007/0217918 A1 | 9/2007 | Baker et al. | |
| 2008/0075603 A1 | 3/2008 | Van Breugel et al. | |
| 2008/0187442 A1* | 8/2008 | Standish et al. | 416/235 |

FOREIGN PATENT DOCUMENTS

| | | |
|---|---|---|
| CA | 2511052 | 7/2004 |
| EP | 0774071 | 10/1999 |
| EP | 1880833 | 1/2008 |
| JP | 04187731 A * | 7/1992 |
| WO | WO 2005/031158 | 4/2005 |
| WO | WO 2007/071249 | 6/2007 |
| WO | WO 2008/003330 | 1/2008 |
| WO | WO 2008/031913 | 3/2008 |

* cited by examiner

*Primary Examiner* — Edward Look
*Assistant Examiner* — Dwayne J White
(74) *Attorney, Agent, or Firm* — Dority & Manning, P.A.

(57) ABSTRACT

A trailing edge bonding cap for use with a rotor blade of a wind turbine is disclosed. The trailing edge bonding cap may include a body projecting outwardly from a blade shell of the rotor blade. The body may have a first outer surface and a second outer surface. The first outer surface may intersect the second outer surface to define a trailing edge of the rotor blade. Additionally, the first and second outer surfaces may have a profile configured to correspond to an aerodynamic profile of the blade shell.

19 Claims, 3 Drawing Sheets

TRAILING EDGE BONDING CAP FOR WIND TURBINE ROTOR BLADES

FIELD OF THE INVENTION

The present subject matter relates generally to rotor blades for a wind turbine and, more particularly, to a trailing edge bonding cap for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, nacelle, and one or more rotor blades. The rotor blades capture kinetic energy of the wind using known airfoil principles. The rotor blades transmit the kinetic energy in the form of rotational energy so as to turn a shaft coupling the rotor blades directly or indirectly to the generator. The generator then converts the mechanical energy to electrical energy that may be deployed to a utility grid.

The typical configuration of a conventional rotor blade generally includes a root section, a blade tip, and a blade shell extending between the root section and blade tip. The blade shell generally defines the aerodynamic airfoil shape of the rotor blade and may be formed from a fiber-reinforced material, such as glass fiber, carbon fiber, or the like. Additionally, the blade shell is typically a composite design, being manufactured from separate shell components which are bonded together. To bond the shell components, a thick layer of adhesive is typically applied to one or both of the shell components. The shell components are then brought into contact with one another (e.g., by placing the shell components on top of each other) to form a thick adhesive bond line around the edge of the blade shell (i.e., the leading and trailing edges of the rotor blade).

The use of adhesive bonding to combine the shell components of the blade shell often leads to significant performance penalties, particularly with respect to the trailing edge of the rotor blade. For example, due to the layer of adhesive, the trailing edge is inherently thicker resulting in a reduction of the aerodynamic efficiency of the rotor blade. This increased thickness also generates additional pure tone noises during operation of the wind turbine. Moreover, exposed portions of the adhesive are often very sensitive to erosion occurring in the field, which can lead to a weakening of the bond between the shell components. Further, it is often very difficult to apply the adhesive in controlled amounts, which results in rotor blades with poor tolerances, varying trailing edge thicknesses, and reduced efficiencies.

Accordingly, there is a need for a trailing edge bonding cap for use with a wind turbine rotor blade that results in reduced performance penalties.

BRIEF DESCRIPTION OF THE INVENTION

Aspects and advantages of the invention will be set forth in part in the following description, or may be obvious from the description, or may be learned through practice of the invention.

In one aspect, the present subject matter discloses a trailing edge bonding cap for use with a rotor blade of a wind turbine. The trailing edge bonding cap may include a body configured to project outwardly from a blade shell of the rotor blade. The body may be formed from a metal matrix composite material and may include a first outer surface and a second outer surface. The first outer surface may be configured to intersect the second outer surface to define a trailing edge of the rotor blade. Additionally, the first and second outer surfaces may have a profile configured to correspond to an aerodynamic profile of the blade shell.

In another aspect, the present subject matter discloses a rotor blade for a wind turbine. The rotor blade includes a root portion, a blade tip and a blade shell extending between the root portion and the blade tip. The blade shell generally has an aerodynamic profile and may include a first shell component and a second shell component. Additionally, the rotor blade may include a trailing edge bonding cap partially disposed between the trailing ends of the first and second shell components. The trailing edge bonding cap may be configured as discussed above and described in greater detail herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
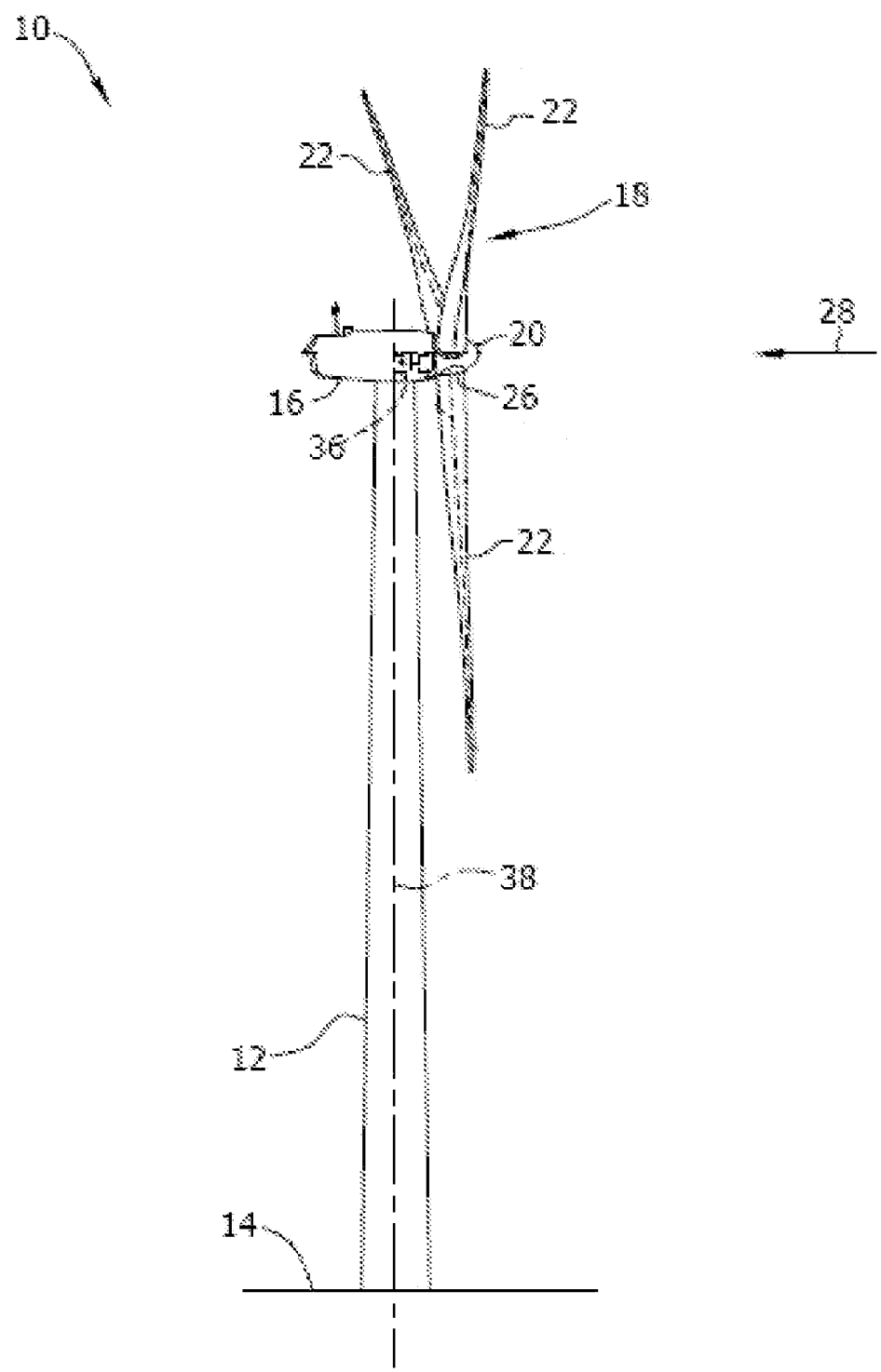
FIG. 1 illustrates a perspective view of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a trailing edge bonding cap for use within a rotor blade of a wind turbine. In particular, the trailing edge bonding cap may project outwardly from the blade shell of the rotor blade to form the trailing edge of the rotor blade. In general, it is believed that the trailing edge bonding cap of the present subject matter may offer numerous advantages. For example, the bonding cap may be precisely and accurately formed and/or machined to match and/or correspond to the aerodynamic profile of the rotor blade. This can ensure a smooth transition between the side shells and the bonding cap to reduce shear forces acting on the trailing edge of the rotor blade. Additionally, the bonding cap may be fabricated so as to create a sharp or cusp trailing edge. As is generally understood, a sharp trailing edge (e.g., a trailing edge having a minimal thickness or a thickness approaching zero) may increase the aerodynamic efficiency of the rotor blade, such as by increasing the lift-to-drag ratio, and may also reduce or eliminate the generation of pure tone noises. Moreover, the bonding cap may be formed from a rigid material, such as a metal matrix composite material, that enhances the structural integrity and bonding strength at the trailing edge. For example, a rigid material may reduce the likelihood of buckling of the rotor blade at the trailing edge and may also increase edge stiffness. Further, by forming the bonding cap from a material having a high electrical conductivity (e.g., an aluminum alloy), the bonding cap may serve as an effective lightning conductor for the wind turbine.

Referring to the drawings, FIG. 1 illustrates a perspective view of a wind turbine 10. As shown, the wind turbine 10 is a horizontal-axis wind turbine. However, it should be appreciated that the wind turbine 10 may be a vertical-axis wind turbine. In the illustrated embodiment, the wind turbine 10 includes a tower 12 that extends from a support surface 14, a nacelle 16 mounted on the tower 12, and a rotor 18 that is coupled to the nacelle 16. The rotor 18 includes a rotatable hub 20 and at least one rotor blade 22 coupled to and extending outwardly from the hub 20. As shown, the rotor 18 includes three rotor blades 22. However, in an alternative embodiment, the rotor 18 may include more or less than three rotor blades 22. Additionally, in the illustrated embodiment, the tower 12 is fabricated from tubular steel to define a cavity (not illustrated) between the support surface 14 and the nacelle 16. However, in an alternative embodiment, the tower 12 may be any suitable type of tower known in the art.

The rotor blades 22 may generally have any suitable length that enables the wind turbine 10 to function as described herein. For example, in one embodiment, the rotor blades 22 may have a length ranging from about 15 meters (m) to about 91 m. However, other non-limiting examples of blade lengths may include 10 m or less, 20 m, 37 m or a length that is greater than 91 m. Additionally, the rotor blades 22 may be spaced about the hub 20 to facilitate rotating the rotor 18 to enable kinetic energy to be transferred from the wind into usable mechanical energy, and subsequently, electrical energy. Specifically, the hub 20 may be rotatably coupled to an electric generator (not illustrated) positioned within the nacelle 16 to permit electrical energy to be produced. Further, the rotor blades 22 may be mated to the hub 20 by coupling a blade root portion 26 of the blade 22 to the hub 20.

As shown in the illustrated embodiment, the wind turbine 10 may also include a turbine control system or turbine controller 36 centralized within the nacelle 16. However, it should be appreciated that the controller 36 may be disposed at any location on or in the wind turbine 10, at any location on the support surface 14 or at any other suitable location. Generally, the controller 36 may be configured to control the various operating modes of the wind turbine 10 (e.g., start-up or shut-down sequences). Additionally, the controller 36 may control many of the various components of a wind turbine 10. For example, as the direction 28 of the wind changes, the controller 36 may be configured to control a yaw direction of the nacelle 16 about a yaw axis 38 to position the rotor blades 22 with respect to the direction 28 of the wind. In particular, the controller 36 may control a yaw drive mechanism (not illustrated) of the nacelle 16 in order to rotate the nacelle 16 about the yaw axis 38.

Figure 2:
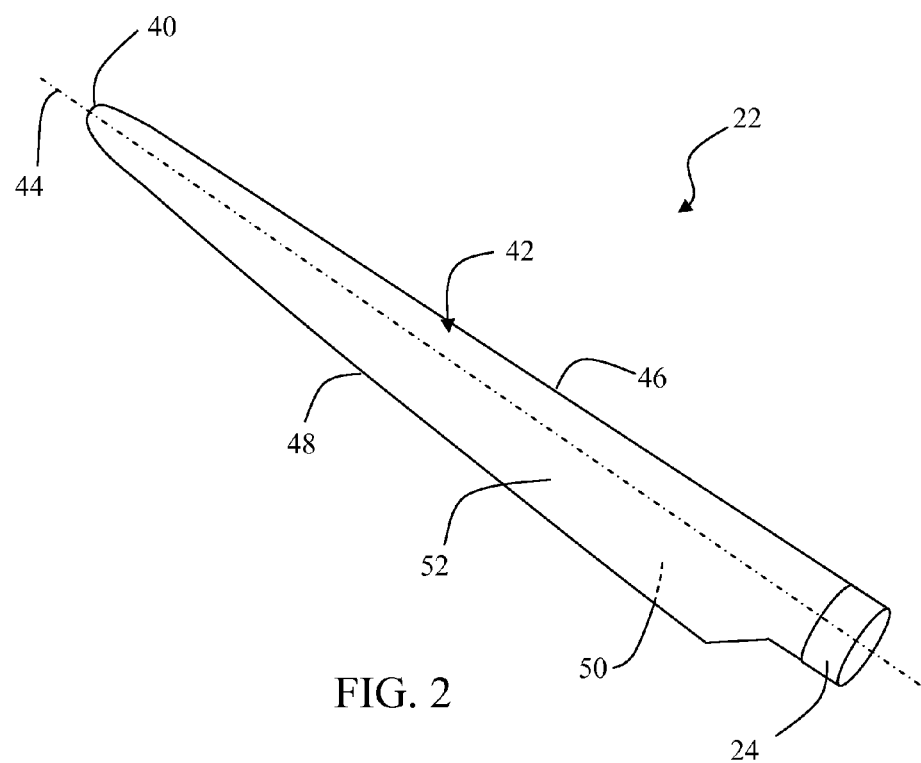
FIG. 2 illustrates a perspective view of a rotor blade of a wind turbine.

Referring now to FIG. 2, a perspective view of a rotor blade 22 is illustrated. As shown, the rotor blade 22 includes a root portion 24 used to mount the rotor blade 22 to the hub 20 (FIG. 1). The rotor blade 22 also includes a blade tip 40 disposed opposite the root portion 24. A blade shell 42 generally extends along a central axis 44 between the root portion 24 and the blade tip 40 and defines a leading edge 46 and a trailing edge 48 of the rotor blade 22. In one embodiment, the blade shell 42 of the rotor blade 22 may be manufactured as a two-piece construction, including a first shell component 50 and a second shell component 52. It should be appreciated that each shell component 50,52 may generally define a substantially aerodynamic profile. Thus, when combined, the shell components 50,52 form a blade shell 42 having an aerodynamic airfoil shape that enables the rotor blade 22 to capture kinetic energy from the wind using known airfoil principles.

Figure 3:
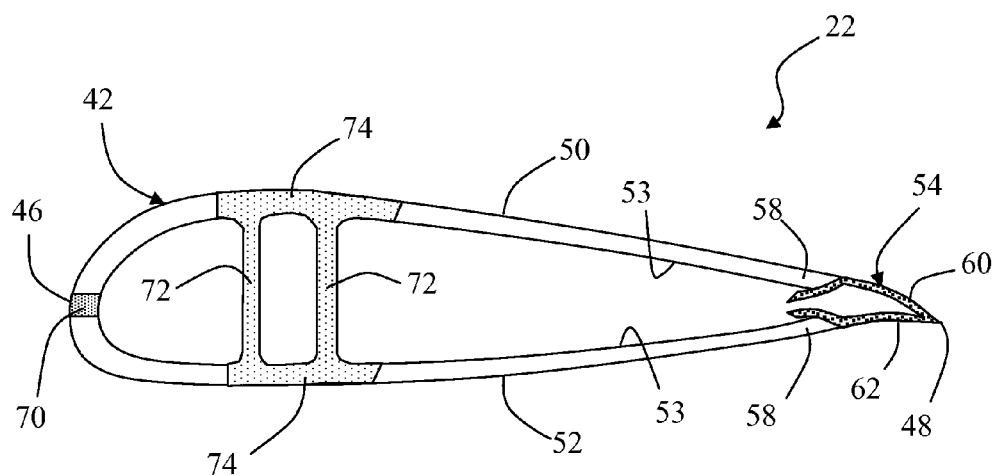
FIG. 3 illustrates a cross-sectional view of a rotor blade with a trailing edge bonding cap installed in accordance with aspects of the present subject matter; and, FIG. 4 illustrates a partial perspective view of a trailing edge bonding cap in accordance with aspects of the present subject matter.
Figure 4:
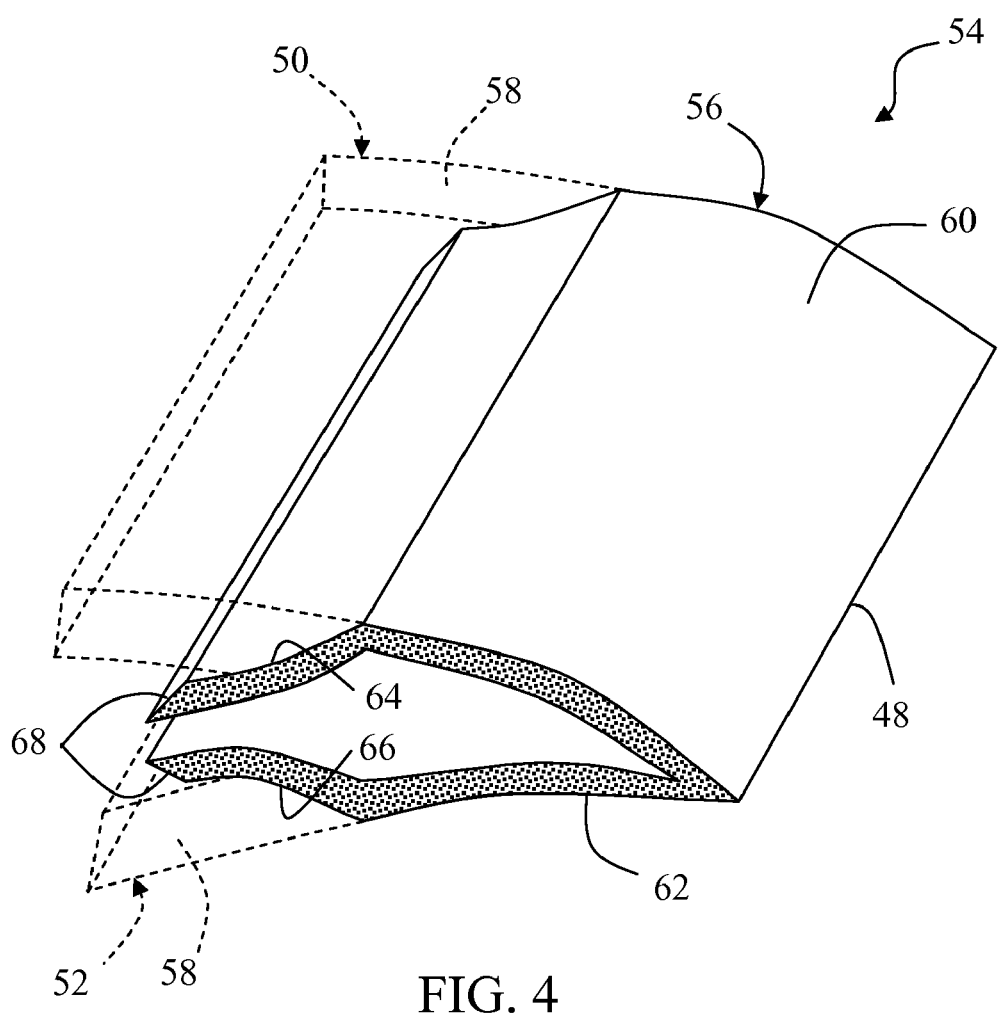

Referring now to FIGS. 3-4, an embodiment of a trailing edge bond cap 54 for both connecting the shell components 50,52 of the blade shell 42 and forming the trailing edge 48 of a rotor blade 22 is illustrated. In particular, FIG. 3 illustrates a cross-sectional view of a rotor blade 22 with a trailing edge bonding cap 54 installed in accordance with aspects of the present subject matter. FIG. 4 illustrates a partial perspective view of an embodiment of a trailing edge bond cap 54 in accordance with aspects of the present subject matter.

Generally, the trailing edge bonding cap 54 of the present subject matter may comprise a rigid body 56 configured to project outwardly from the blade shell 42 of the rotor blade 22 in a direction away from its leading edge 46. For example, as shown in FIGS. 3 and 4, the bonding cap 54 may be partially disposed between the trailing ends 58 of the first and second shell components 50,52 and project outwardly from the trailing ends 58. The bonding cap 54 may also extend longitudinally along the length of the rotor blade 22 to form the trailing edge 48 of the blade 22. In one embodiment, the bonding cap 54 may be formed as a single piece that extends along the entire length of the blade 22. Alternatively, the bonding cap 54 may be formed as multiple pieces such that the bonding cap 54 is segmented along the length of the blade 22. Further, the transverse or chord length of the trailing edge bonding cap 54 may generally vary depending on the configuration of the rotor blade 22. However, in one embodiment, the ratio of the bonding cap chord length to the rotor blade chord length (i.e., the distance between the trailing edge 48 and the leading edge 46 of the rotor blade 22) may be about 1:20 to ensure that the blade 22 exhibits buckling stability and structural integrity.

Additionally, in one embodiment, the trailing edge bonding cap 54 may have a profile configured to match or correspond to the aerodynamic profile of the rotor blade 22. For instance, the body 56 of the bonding cap 54 may be configured to be disposed substantially flush with the outer profile of the blade shell 42 such that the bonding cap 54 serves as an extension of the airfoil shape of the rotor blade 22. Specifically, a first outer surface 60 of the bonding cap 54 may have a profile that corresponds to the aerodynamic profile of the first shell component 50. Thus, a smooth aerodynamic transition may exist between the bonding cap 54 and the first shell component 50. Similarly, a second outer surface 62 of the bonding cap 54 may have a profile that corresponds to the aerodynamic profile of the second shell component 52 to provide a smooth aerodynamic transition at the interface of the second shell component 52 and the trailing edge bonding cap 54.

It should be appreciated that the intersection of the first and second outer surfaces 60,62 of the bonding cap 54 may generally define the trailing edge 48 of the rotor blade 22. In one embodiment, the trailing edge bonding cap 54 may be configured to provide a sharp or cusp trailing edge 54. For example, the body 56 of the bonding cap 54 may be formed such that a minimal thickness exists at the intersection of the first and second outer surfaces 60,62 (e.g., the thickness of the body 56 may approach zero at the intersection of the outer surfaces 60,62). As such, the rotor blade 22 may exhibit improved aerodynamic efficiency, such as by having an increased lift-to-drag ratio. Additionally, providing a sharp trailing edge 54 may also reduce or eliminate the generation of pure tone noises during operation of the wind turbine 10.

The body 56 of the trailing edge bonding cap 54 may also include at least one bonding surface extending within the rotor blade 22. Generally, the at least one bonding surface may be configured to secure the trailing edge bonding cap 54 to the blade shell 42. For example, the at least one bonding surface may be configured to be attached to the blade shell 42 so as to form a lap joint between the first and second shell components 50,52. As particularly shown in FIG. 4, the trailing edge bonding cap 54 may include a first bonding surface 64 and a second bonding surface 66. Each of the bonding surfaces 64,66 may be configured to engage the trailing ends 58 of the first and second shell components 50,52 to secure the bonding cap 54 to the rotor blade 22 and thereby enclose the blade shell 42 and form the trailing edge 58 of the rotor blade 22. In one embodiment, the bonding surfaces 64,66 may be concavely shaped such that the ends 68 of the bonding cap 54 flare outwards within the blade shell 42 toward the inner surfaces 53 of the first and second shell components 50,52 and ensure that the bonding cap 54 properly engages the blade shell 42. Additionally, it should be appreciated by those of ordinary skill in the art that the minimum length and/or surface area of the bonding surfaces 64,66 required to provide sufficient bonding between the shell components 50,52 and the bonding cap 54 may generally vary depending on, for example, the blade structure and the loading anticipated on the rotor blade 22 during use.

Additionally, it should be appreciated that the bonding surfaces 64,66 may be disposed within and secured to the blade shell 42 by any suitable means. In a particular embodiment, the trailing edge bonding cap 54 may be installed within the blade shell 42 during fabrication of the shell components 50,52. For example, the first and second shell components may be formed within corresponding top and bottom molds such that, once cured, the shell components may be combined to form airfoil shape of the rotor blade 22. Thus, in one embodiment, the trailing edge bonding cap 54 may be placed along the length of the shell component formed in the bottom mold (e.g., the second shell component 52) and the corresponding bonding surface (e.g., bonding surface 66) of the bonding cap 54 may be secured to the trailing edge 58 of such shell component. For example, in one embodiment, the corresponding bonding surface may be secured to the shell component formed in the bottom mold using a high performance glue material. After securing the bonding cap 54 to the bottom shell component, each shell component (e.g., the first and second shell components 50,52) may be cured independently. After curing, the top mold may then be positioned over the bottom mold to permit the top shell component (e.g., the first shell component 50) to be secured to the bonding cap 54. For example, a high performance glue material may be placed along the corresponding bonding surface (e.g., bonding surface 64) of the bonding cap 54 such that, when the mold is closed over the bonding cap 54, the bonding cap 54 is properly secured between the shell components 50,52 of the rotor blade 22. The formed rotor blade 22 may then be post-cured and subjected to any additional processes necessary to complete the manufacture of the blade 22. It should be appreciated that, although the above described embodiment uses high performance glue material, other embodiments may use any other adhesive or fastening means, such as, but not limited to, mechanical fasteners, to facilitate attachment of the bonding cap 54 to the rotor blade 22.

Generally, the trailing edge bonding cap 54 may be formed from any rigid material that provides a stiff interface between the shell components 50,52 and thereby enhances the structural integrity of the rotor blade 22 and reduces the likelihood of the shell components 50,52 buckling at the trailing edge 48 during operation of the wind turbine 10. In one embodiment, the body 56 may be formed from a metal matrix composite material. A metal matrix composite material may generally comprise a material having two constituent parts, one being a metal and the other being a reinforcement material. For example, monofilament wires, fibers or particles may be embedded or dispersed within a metal matrix to change the physical properties of the metal. Such a configuration allows metal matrix composite materials to have very high strength to weight ratios as compared to metals alone. Thus, the use of a trailing edge bonding cap 54 formed from a metal matrix composite material may be particularly advantageous due to the increase in structural rigidity and integrity of a rotor blade 22 without unnecessary increases in weight.

In one embodiment of the present subject matter, the body 56 of the trailing edge bonding cap 54 may be formed from an aluminum alloy matrix reinforced with carbon or boron fibers. As such, the trailing edge bonding cap 54 may be very lightweight and have a high strength/stiffness, thereby enhancing the edge stiffness, erosion resistance and structural integrity of the rotor blade 22 without substantially increasing its weight. Such enhanced structural integrity may prevent buckling of a rotor blade 22, eliminating the need to provide an auxiliary spar cap/shear web at the trailing edge 48. Additionally, due to the high electrical conductivity of aluminum, a trailing edge bonding cap 54 formed from an aluminum matrix may serve as an effective lightning protection system for the wind turbine 10. Of course, it should be appreciated that various other suitable metals and reinforcement materials may be used within a metal matrix composite material to form the trailing edge bonding cap 54 of the present subject matter.

It should also be appreciated that the trailing edge bonding cap 54 may generally comprise a pre-fabricated component. As such, the body 56 of the bonding cap 54 may be machined to provide any desired aerodynamic profile. Additionally, suitable machining processes may be used to form a bonding cap 54 with a high dimensional stability in order to provide precise alignment of the bonding cap 54 with the blade shell 42 for optimal aerodynamic efficiency. The bonding cap 54 may also be subjected to any suitable finishing process to ensure a smooth surface finish along the outer surfaces 60,62 of the body 56. Further, it should be appreciated that the body 56 of the bonding cap 54 may be manufactured to have any suitable cross-section. For example, as shown in FIGS. 3 and 4, the bonding cap 54 may have a hollow cross-section or, in an alternative embodiment, the bonding cap 54 may have a solid cross-section.

It should be appreciated that FIG. 3 illustrates additional components of a rotor blade 22. For example, adhesive material or a bonding cap 70 may be disposed at the leading edge 46 of the rotor blade 22, such as at the leading edge interface of the first and second shell components 50,52. Additionally, the rotor blade 22 may also include a pair of shear webs 72 positioned between top and bottom spar caps 74. Generally, the top and bottom spar caps 74 may extend substantially along the full longitudinal length of each shell component 50,52 and may be bonded to an inner surface of the shell components 50,52. Further, the internal shear webs 72 may run longitudinally between the shell components 50,52 and may be adhered to the spar caps 74 so as to improve the structural rigidity of the rotor blade 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A trailing edge bonding cap for use with a rotor blade of a wind turbine, the trailing edge bonding cap comprising:
   a body configured to project outwardly from a blade shell of the rotor blade, said body being formed from a metal matrix composite material and having a first outer surface and a second outer surface, said first outer surface configured to intersect said second outer surface to define a trailing edge of the rotor blade,
   wherein said first and second outer surfaces have a profile configured to correspond to an aerodynamic profile of said blade shell and wherein said body is segmented along a length of the trailing edge bonding cap.

2. The trailing edge bonding cap of claim 1, wherein said metal matrix composite material comprises an aluminum alloy matrix reinforced with carbon or boron fibers.

3. The trailing edge bonding cap of claim 1, wherein said metal matrix composite material comprises an electrically conductive metal.

4. The trailing edge bonding cap of claim 1, wherein said body has a hollow cross-section.

5. The trailing edge bonding cap of claim 1, wherein said body comprises at least one bonding surface configured to be secured to said blade shell.

6. The trailing edge bonding cap of claim 5, wherein said at least one bonding surface comprises a first bonding surface and a second bonding surface, said first and second bonding surfaces configured to extend within the rotor blade and engage trailing ends of said blade shell.

7. The trailing edge bonding cap of claim 6, wherein said first and second bonding surfaces are concavely shaped.

8. The trailing edge bonding cap of claim 1, wherein the profile of said first outer surface is configured to correspond to the aerodynamic profile of a first shell component of said blade shell and the profile of said second outer surface is configured to correspond to the aerodynamic profile of a second shell component of said blade shell.

9. The trailing edge bonding cap of claim 1, wherein the intersection of said first and second outer surfaces defines a sharp trailing edge.

10. A rotor blade for a wind turbine, the rotor blade comprising:
    a root portion;
    a blade tip;
    a blade shell extending between said root portion and said blade tip, said blade shell having an aerodynamic profile and comprising a first shell component and a second shell component; and,
    a trailing edge bonding cap partially disposed between trailing ends of said first and second shell components, said trailing edge bonding cap being formed from a metal matrix composite material and having a first outer surface and a second outer surface, said first outer surface intersecting said second outer surface to define a trailing edge of the rotor blade,
    wherein said first and second outer surfaces have a profile configured to correspond to the aerodynamic profile of said blade shell and wherein said trailing edge bonding cap is segmented along a length of the rotor blade.

11. The rotor blade of claim 10, wherein said metal matrix composite material comprises an aluminum alloy matrix reinforced with carbon or boron fibers.

12. The trailing edge bonding cap of claim 10, wherein said metal matrix composite material comprises an electrically conductive metal.

13. The rotor blade of claim 10, wherein said trailing edge bonding cap has a hollow cross-section.

14. The rotor blade of claim 10, wherein said trailing edge bonding cap comprises at least one bonding surface secured to said blade shell.

15. The rotor blade of claim 14, wherein said at least one bonding surface comprises a first bonding surface and a second bonding surface, said first and second bonding surfaces extending within the rotor blade and engaging said trailing ends of said first and second shell components.

16. The rotor blade of claim 15, wherein said first and second bonding surfaces are concavely shaped.

17. The rotor blade of claim 10, wherein the profile of said first outer surface is configured to correspond to the aerodynamic profile of said first shell component, the profile of said second outer surface being configured to correspond to the aerodynamic profile of said second shell component.

18. The rotor blade of claim 10, wherein the intersection of the first and second outer surfaces defines a sharp trailing edge.

19. The rotor blade of claim 10, wherein a ratio of a chord length of the trailing edge bonding cap to a chord length of the rotor blade is about 1:20.

* * * * *